United States Patent [19]

Komine

[11] Patent Number: 4,539,601
[45] Date of Patent: Sep. 3, 1985

[54] PORTABLE VIDEO SYSTEM

[75] Inventor: Yoshio Komine, Kanagawa, Japan

[73] Assignee: Canon Kabushiki Kaisha, Tokyo, Japan

[21] Appl. No.: 527,381

[22] Filed: Aug. 29, 1983

Related U.S. Application Data

[63] Continuation of Ser. No. 292,738, Aug. 14, 1981.

[30] Foreign Application Priority Data

Aug. 20, 1980 [JP] Japan .................................. 55-117802

[51] Int. Cl.³ .............................................. H04N 5/76
[52] U.S. Cl. .................................... 358/335; 358/906; 358/229; 360/33.1
[58] Field of Search ........................ 358/335, 906, 229; 360/33.1; 369/11

[56] References Cited

U.S. PATENT DOCUMENTS

| | | | |
|---|---|---|---|
| 4,057,830 | 11/1977 | Adcock | 358/906 |
| 4,074,082 | 2/1978 | Sato | 369/11 |
| 4,232,329 | 11/1980 | Horak | 358/906 |
| 4,368,490 | 1/1983 | Takimoto | 358/335 |
| 4,447,837 | 5/1984 | Hirata | 358/335 |

FOREIGN PATENT DOCUMENTS 58315 5/1977 Japan .................................. 358/906

OTHER PUBLICATIONS

Fujinon TV Lenses Advertisement, ©1977.

*Primary Examiner*—Alan Faber
*Attorney, Agent, or Firm*—Toren, McGeady, Stanger, Goldberg & Kiel

[57] ABSTRACT

In a portable video system for recording motion pictures by using a video camera and a video recorder, the cable cord connecting said video camera with the video recorder is made detachable, and the cable cord connection terminal on the bottom panel of the housing of the video camera and the cable cord connection terminal on the upper panel of the housing of the video recorder are constructed to be directly connectable to each other so that said camera may be fixedly mounted on said recorder. A grip is arranged on one of the side panels of said camera housing to be usable in any of the cases where the camera is in isolation and where the recorder is directly connected to the camera, and the recorder is provided with a tripod screw hole for enabling attachment of a tripod thereto at the bottom panel of the housing thereof.

11 Claims, 4 Drawing Figures

PORTABLE VIDEO SYSTEM

This application is a continuation of application Ser. No. 292,738, filed Aug. 14, 1981.

BACKGROUND OF THE INVENTION

This invention relates to portable video camera recorder systems, each composed of a video camera and a video tape recorder (VTR), and more particularly to portable video systems in which the video camera and the recorder can be releasably connected with each other to be used as a unitary instrument.

Recent advances in the electronic art have promoted the trend toward minimization in the bulk and size of the video cameras and VTRs. Thanks to the use of solid state devices or CCDs, video cameras particularly have profited from minizing their bulk, size, and weight, so much so that they have been made equal to the size and weight of a small sized cine camera.

In contrast, even VTRs of the type using small cassette tapes, because of their drive mechanisms, electrical power sources, and other devices, cannot be reduced in size and weight to the level of the camera. Therefore, VTRs have commonly been suspended by a shoulder strap when in use. It is very likely, however, that even such VTRs will have in the near future be reduced in bulk, size, and weight. At the present time, portable video recorder systems make use of at least one cable for transmission of signals and electrical power between the camera and the VTR. The camera and VTR are constructed as instruments independent of each other. However, under the usual working conditions, they serve as portable instruments and are often combined as a pair when put into practical use.

Therefore, conventional systems have problems when portability becomes important. Manageability thereof is not only unsatisfactory, but while carrying them about, the operator is unable to act swiftly. When not in use, storage is also inconvenient.

SUMMARY OF THE INVENTION

An object of the present invention is to provide a portable video system which is excellent in manageability, portability and mobility.

Another object is to provide a portable video system operating either with or without a signal transmission cord.

Still another object is to provide a portable video system which is quickly and easily supported on a tripod or other suitable means.

A further object is to provide a portable video system which can take a suitable one of the operating modes for the various working situations.

According to an embodiment of the present invention, the portable video system is provided with a coupling means to enable the camera and the recorder to be used as a unit, thereby giving an advantage that the system as a whole is made compact. An additional advantage is that the portability, manageability and mobility are remarkably improved.

Where the camera and the recorder are coupled with each other, the signal channel between the camera and the recorder is established without the use of a cable cord which would be otherwise necessary, thus contributing to an increase in the improvement of manageability.

Another feature is that at the bottom of the recorder there is provided a receiver for attachment of the tripod or other supporter and on the top of the recorder, the camera may be mounted so that it is easy to support the entire system so that the camera and the recorder work as a unit.

In outdoor photography the system may take the unified form, and the operator can enjoy the improved portability and manageability. In order to reproduce in a room, the camera may be taken off of the recorder. If so, a good arrangement is realized, and there is no possibility of damaging the camera.

DESCRIPTION OF THE PREFERRED EMBODIMENT

Figure 1:
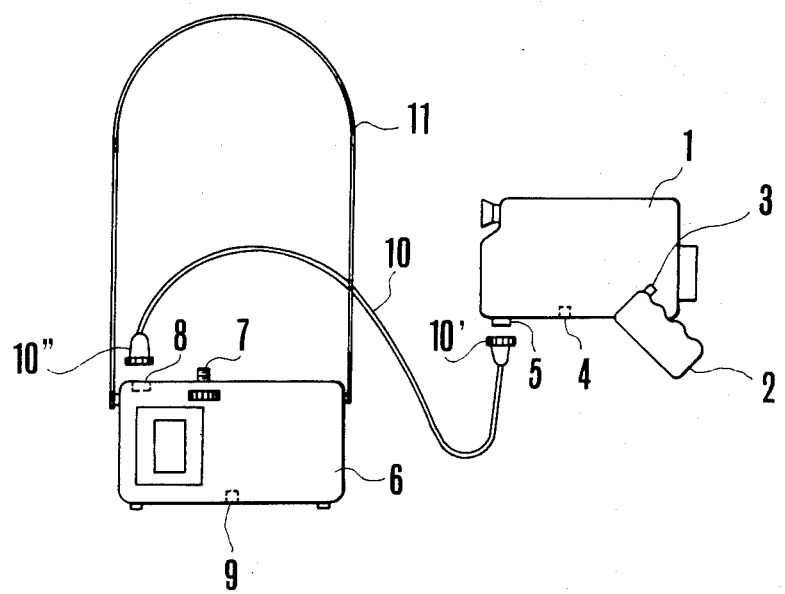
FIG. 1 is a side elevational view showing the fundamental construction of a portable video system of the invention.

The present invention will next be described in greater detail by reference to the drawings. FIG. 1 shows the construction and arrangement of the essential parts of a portable video system according to the present invention. In the drawing, a video camera 1 is of an extremely simple form including an optical finder, a CCD and a battery. This camera even when in isolation is made to produce standard type composite television signals. The camera may be either a black-and-white, or a color television camera. The finder may be either the optical one as shown in the drawing, or an electronic one. A grip 2 on one of the side panels of the camera housing has a release button 3. A tripod screw thread 4 is provided in the bottom panel of the camera housing at which a tripod or other suitable supporter is attachable. A cable connector 5 is used as a signal transmitting means located on the bottom panel of the camera housing. A video tape recorder 6 records video signals onto a cassette tape. A screw fastener 7 couples the recorder 6 directly to the camera 1 at the tripod screw-threaded hole 4, this screw fastener and the screw-threaded hole 4 form a coupling means. A cable connector 8 is used as a signal transmitting means provided on the upper panel of the recorder casing. A video cable 10 connects the camera 1 to recorder 6, the both ends of which have respective connection plugs 10' and 10'' to be inserted into the cable connectors 5 and 8 and then fixed therein in screw-threaded relation. A tripod screw thread 9 is arranged in the bottom panel of the recorder 6 to be used when a tripod or other supporter is to be attached. A removable shoulder strap 11 is attached to the recorder body.

FIG. 1 represents an operating mode where the camera and the recorder work with the use of the cable. When taking pictures in this mode, the operator carries about the recorder on his shoulder by the shoulder strap or sets it aside and manipulates the camera 1 by hand-holding the grip 2. Though the recorder has been reduced in size and weight to some extent, it is yet considerably heavy since the drive mechanism and many batteries are included. In a photographic situation where the object to be shot without the necessity of a wide range of movement, the flexible connection is convenient as the recorder can be suspended alone from the operator's shoulder or installed beside him.

Figure 2:
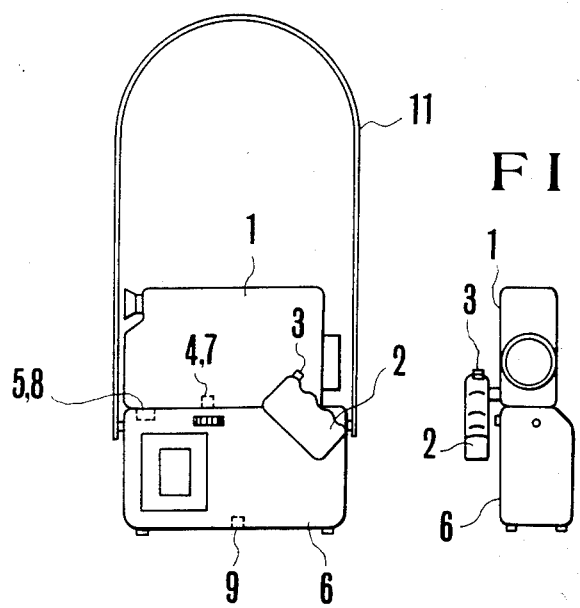
FIGS. 2 and 3 are side and front elevational views respectively of the video camera and the recorder coupled with each other to form a unit according to the present invention.
Figure 3:
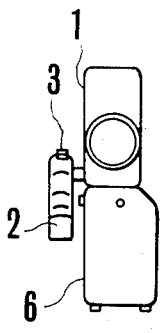

FIG. 2 shows in the side elevational view another operating mode where the video camera and the recorder are combined to form a unit according to the present invention. FIG. 3 also shows this unit as looking from the front. Note that the same reference numerals have been employed in FIGS. 2 and 3 to denote the similar parts to those shown in FIG. 1. Where the camera and the recorder are coupled directly with each other as shown in the drawings, the camera side cable connector 5 and the recorder side connector 8 are in direct contact with each other. Such coupling is fixed by the screw fastener 7 threaded in the tripod screw-threaded hole 4 of the camera. In the drawings, the fixed coupling of the camera with the recorder is shown to take the form of a tripod screw, but may be otherwise established by using one of the many methods known in the art.

As shown in FIG. 3, when the camera 1 and the recorder 6 are coupled with each other, the grip 2 lying at the side of the camera is in almost the same plane as the corresponding side of the recorder 6. Such construction permits the grip 2 to be used even when the camera is coupled with the recorder as a unit.

Figure 4:
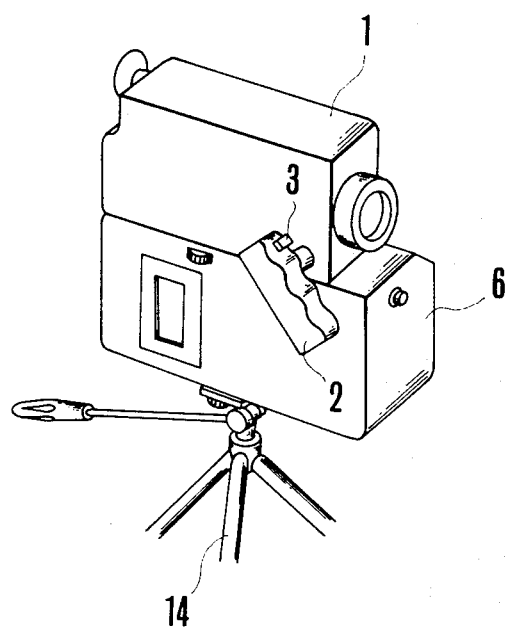
FIG. 4 is a perspective view of the video camera and recorder of the invention coupled with each other and supported on a tripod.

The unified form of the camera and recorder as shown in FIGS. 2 and 3 is a heavier as a unit than when in the working condition shown in FIG. 1, but thanks to the dispensible cable cord it can be handled as if it were a single camera. This form also enables the operator to carry the camera about with the recorder as a unitary instrument while suspended by the shoulder strap 11. As shown in FIG. 4, the camera and the recorder are coupled as the unit. The tripod screw-threaded hole 9 in the bottom panel of the recorder casing when used to mount the unit on a tripod 14 enables the operator to take the pictures in a manner similar to that in which the camera in separation operates on the tripod. This is very convenient in handling the system when shooting.

When the unified form, as shown in FIGS. 2 and 3 is taken, the center of gravity assumes a position which allows the unit to become very stable since the recorder section is heavier than the camera. Therefore, in a case where this is hand-held when shooting, and even in case where this is used with the tripod when to shot, it is possible to stabilize the camera operation.

It will be seen from the foregoing that the present invention provide a portable video system operating with the selection of the working forms including not only that in which the camera and the recorder are flexibly connected with each other by the use of a cable cord as in prior cameras, but also that in which the recorder is coupled to the camera at the bottom thereof in a fixedly secured relation. The hand-held shooting with the use of the camera side grip and the tripod-supported shooting are also made selectively possible. The system may be left unchanged from the unified form and made portable by the shoulder strap.

What is claimed is:

1. A portable video system including:
   (a) a video camera for producing video signals and having a casing with a plurality of attachment surfaces;
   (b) video recorder for receiving the video signals from said camera and recording the signal on a recording medium;
   (c) first coupling means for coupling said camera and said recorder with each other as a unit
   (d) a signal transmitting cord for transmitting the video signals from the camera to the recorder when the camera and the recorder are not coupled together, said video recorder being heavier than the camera and having a recorder casing with a plurality of surfaces,
   (e) said first coupling means including a tripod opening with threads at the bottom surface of the camera casing, and said recorder including a threaded bolt campatible with the opening mounted in a manually rotatable manner at the top surface of the recorder casing, and
   (f) second coupling means for coupling the recorder and a tripod with each other, and having a tripod opening with threads at a bottom surface of the recorder casing.

2. A portable video system including:
   (a) a video camera for producing video signals and having a casing with a plurality of attachment surfaces,
   (b) grip means for attachment to one of the attachment surfaces and for holding the video camera;
   (c) a video recorder for receiving the video signals from said camera and recording the signal on a recording medium;
   (d) first coupling means for coupling said camera and said recorder with each other as a unit; and
   (e) a signal transmitting cord for transmitting the video signals from the camera to the recorder when the camera and the recorder are not coupled together, said grip means being attachable to one attachment surface of the camera casing, said recorder having a recorder casing with a plurality of surfaces,
   (f) the attachment surfaces of the camera casing including a side surface and a bottom surface and the grip means being attachable to the side surface of the camera casing and the recorder being attachable to the bottom surface of the camera casing, the side surface of the camera and the side surface of the recorder lying substantially in a single plane.

3. A system as in claim 2, further comprising elongated carrying means extending from the recorder for carrying the recorder.

4. A system as in claim 3, wherein said elongated carrying means has ends attached to the recorder for suspending and carrying the recorder.

5. A system as in claim 4, wherein said elongated carrying means is a strap.

6. A portable video system, comprising:
   (a) a video camera capable of producing video signals and including,
      (i) first mechanical coupling means, and
      (ii) first electrical coupling means for outputting the video signals,
   (b) a video recorder for receiving the video signals from the camera and recording the signal on a recording medium, said recorder including:
      (i) second mechanical coupling means, and
      (ii) second electrical coupling means for receiving the video signals, and
   (c) a signal transmitting cable for transmitting the video signals from the camera to the recorder when the camera is not coupled with the recorder, said cable including:
      (i) third electrical coupling means, and (ii) fourth electrical coupling means;
(d) wherein the first and second electrical coupling means are directly coupled together when the first and second mechanical coupling means are coupled together, and the first and third electrical coupling means and the second and fourth electrical coupling means are coupled to each other when the camera is coupled with the recorder via said cable.

7. A system as in claim 6, further comprising elongated carrying means extending from the recorder for carrying the recorder.

8. A system as in claim 7, wherein said elongated carrying means has ends attached to the recorder for suspending and carrying the recorder.

9. A system as in claim 8, wherein said elongated carrying means is a strap.

10. A portable video system including:
(a) a video camera for producing video signals and having a casing with a plurality of attachment surfaces,
(b) grip means for holding the video camera;
(c) a video recorder for receiving the video signals from said camera and recording the signal on a recording medium;
(d) first coupling means for coupling said camera and said recorder with each other as a unit; and
(e) a signal transmitting cord for transmitting the video signals from the camera to the recorder when the camera and the recorder are not coupled together, said grip means being attached to one attachment surface of the camera casing said, recorder having a recorder casing with a plurality of surfaces,
(f) the attachment surfaces of the camera casing including a side surface and a bottom surface and the grip means being attached to the side surface of the camera casing and the recorder being attached to the bottom surface of the camera casing, the side surface of the camera and the side surface of the recorder lying substantially in a single plane.

11. A video recording system, comprising:
(a) a video camera for producing video signals, said camera including;
(i) first mechanical means; and
(ii) signal output means for providing the video signals;
(b) a video recorder for receiving the video signals from the camera and for recording the signal on a recording medium, said recorder including;
(i) second mechanical means; and
(ii) signal input means for receiving the video signals; and
(c) signal transmitting means for transmitting the video signals from the camera to the recorder when the camera is not coupled with the recorder, said transmitting means including;
(i) first electrical coupling means, and
(ii) second electrical coupling means;
(d) the output and input means being directly coupled together when the first and second mechanical means are coupled together, and the output and first electrical means and the input and second electrical means being coupled to each other when the camera is associated with the recorder via the transmitting means.

* * * * *